(12) United States Patent
Boudreaux

(10) Patent No.: US 6,247,742 B1
(45) Date of Patent: Jun. 19, 2001

(54) TAILGATE PROTECTING DEVICE

(76) Inventor: Aubrey D. Boudreaux, 919 Delmar St., Morgan City, LA (US) 70380

( * ) Notice: Subject to any disclaimer, the term of this patent is extended or adjusted under 35 U.S.C. 154(b) by 0 days.

(21) Appl. No.: 09/633,568

(22) Filed: Aug. 4, 2000

(51) Int. Cl.[7] .................................................. B62D 25/00
(52) U.S. Cl. ....................... 296/57.1; 296/39.1; 296/39.2; 296/136; 280/770
(58) Field of Search .................. 296/39.1, 39.2, 296/136, 57.1; 280/770

(56) References Cited

U.S. PATENT DOCUMENTS

| | | |
|---|---|---|
| D. 391,545 | 3/1998 | Arndt et al. . |
| 4,531,560 | 7/1985 | Balanky . |
| 4,707,016 | 11/1987 | McDonald . |
| 4,743,058 * | 5/1988 | Fedrigo ................................ 296/57.1 |
| 4,763,945 * | 8/1988 | Murray ................................ 296/39.2 |
| 4,875,731 * | 10/1989 | Ruiz ..................................... 296/39.2 |
| 4,936,625 * | 6/1990 | Pickard et al. ....................... 296/39.2 |
| 5,000,503 * | 3/1991 | Bernatek .............................. 296/39.2 |
| 5,169,201 * | 12/1992 | Gower .................................. 296/39.2 |
| 5,215,345 * | 6/1993 | Orphan ................................. 296/39.1 |
| 5,372,397 * | 12/1994 | Arudt .................................... 296/57.1 |
| 5,556,151 * | 9/1996 | New et al. ............................. 296/39.2 |
| 5,673,960 * | 10/1997 | Sorensen .............................. 296/39.1 |
| 5,722,710 * | 3/1998 | Falciani ................................ 296/39.1 |
| 5,732,995 | 3/1998 | Piccariello . |
| 5,806,909 * | 9/1998 | Wise ..................................... 296/39.2 |
| 5,887,931 * | 3/1999 | Bills et al. ............................ 296/39.2 |

* cited by examiner

Primary Examiner—Joseph D. Pape
Assistant Examiner—Kiran B. Patel

(57) ABSTRACT

A tailgate protecting device for protecting a tailgate from impact damage. The tailgate protecting device includes a plate. The plate has a top edge, a bottom edge, a front side and a back side. A panel is securely attached to and substantially covers the back side of the plate. A first pair of securing means removably attaches the top edge of the plate to a top edge of a tailgate. A second pair of securing means removably attaches the bottom edge of the plate to a bottom edge of the tailgate.

8 Claims, 1 Drawing Sheet

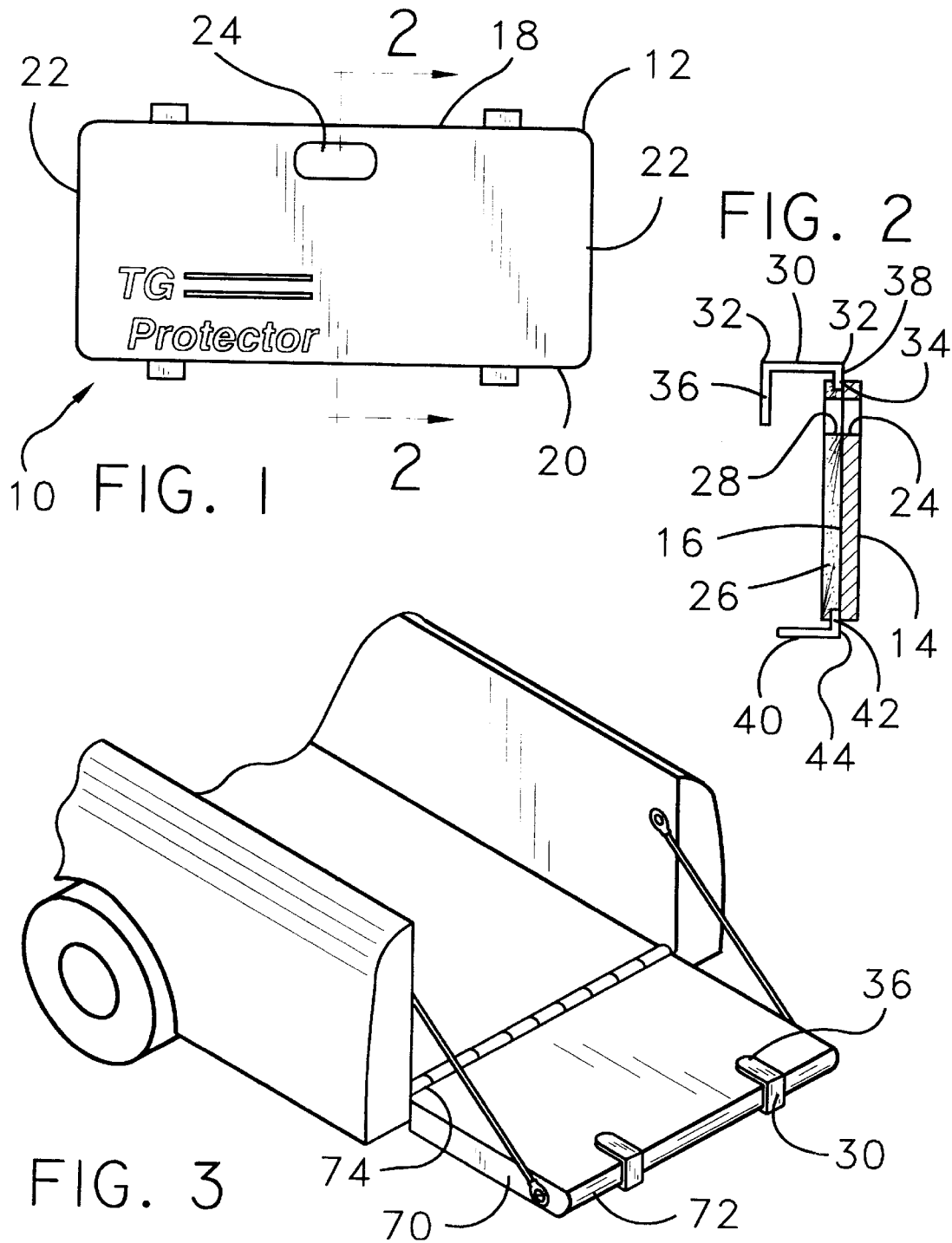

TAILGATE PROTECTING DEVICE

BACKGROUND OF THE INVENTION

1. Field of the Invention

The present invention relates to tailgate protecting devices and more particularly pertains to a new tailgate protecting device for protecting a tailgate from impact damage.

2. Description of the Prior Art

The use of tailgate protecting devices is known in the prior art. More specifically, tailgate protecting devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,707,016; U.S. Pat. No. 5,732,995; U.S. Pat. No. 5,000,503; U.S. Pat. No. 5,169,201; U.S. Pat. No. 4,531,560; and U.S. Des. Pat. No. 391,545.

While these devices fulfill their respective, particular objectives and requirements, the aforementioned patents do not disclose a new tailgate protecting device. The inventive device includes a plate. The plate has a top edge, a bottom edge, a front side and a back side. A panel is securely attached to and substantially covers the back side of the plate. A first pair of securing means removably attaches the top edge of the plate to a top edge of a tailgate. A second pair of securing means removably attaches the bottom edge of the plate to a bottom edge of the tailgate.

In these respects, the tailgate protecting device according to the present invention substantially departs from the conventional concepts and designs of the prior art, and in so doing provides an apparatus primarily developed for the purpose of protecting a tailgate from impact damage.

SUMMARY OF THE INVENTION

In view of the foregoing disadvantages inherent in the known types of tailgate protecting devices now present in the prior art, the present invention provides a new tailgate protecting device construction wherein the same can be utilized for protecting a tailgate from impact damage.

The general purpose of the present invention, which will be described subsequently in greater detail, is to provide a new tailgate protecting device apparatus and method which has many of the advantages of the tailgate protecting devices mentioned heretofore and many novel features that result in a new tailgate protecting device which is not anticipated, rendered obvious, suggested, or even implied by any of the prior art tailgate protecting devices, either alone or in any combination thereof.

To attain this, the present invention generally comprises a plate. The plate has a top edge, a bottom edge, a front side and a back side. A panel is securely attached to and substantially covers the back side of the plate. A first pair of securing means removably attaches the top edge of the plate to a top edge of a tailgate. A second pair of securing means removably attaches the bottom edge of the plate to a bottom edge of the tailgate.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new tailgate protecting device apparatus and method which has many of the advantages of the tailgate protecting devices mentioned heretofore and many novel features that result in a new tailgate protecting device which is not anticipated, rendered obvious, suggested, or even implied by any of the prior art tailgate protecting devices, either alone or in any combination thereof.

It is another object of the present invention to provide a new tailgate protecting device which may be easily and efficiently manufactured and marketed.

It is a further object of the present invention to provide a new tailgate protecting device which is of a durable and reliable construction.

An even further object of the present invention is to provide a new tailgate protecting device which is susceptible of a low cost of manufacture with regard to both materials and labor, and which accordingly is then susceptible of low prices of sale to the consuming public, thereby making such tailgate protecting device economically available to the buying public.

Still yet another object of the present invention is to provide a new tailgate protecting device which provides in the apparatuses and methods of the prior art some of the advantages thereof, while simultaneously overcoming some of the disadvantages normally associated therewith.

Still another object of the present invention is to provide a new tailgate protecting device for protecting a tailgate from impact damage.

Yet another object of the present invention is to provide a new tailgate protecting device which includes a plate. The plate has a top edge, a bottom edge, a front side and a back side. A panel is securely attached to and substantially covers the back side of the plate. A first pair of securing means removably attaches the top edge of the plate to a top edge of a tailgate. A second pair of securing means removably attaches the bottom edge of the plate to a bottom edge of the tailgate.

Still yet another object of the present invention is to provide a new tailgate protecting device that is retrofittable to existing tailgates.

Even still another object of the present invention is to provide a new tailgate protecting device that has a wool panel to protect the tailgate from scratches.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a schematic front view of a new tailgate protecting device according to the present invention.

FIG. 2 is a schematic side cross-sectional view taken along line 2—2 of the present invention.

FIG. 3 is a schematic perspective view in use of the present invention.

DESCRIPTION OF THE PREFERRED EMBODIMENT

With reference now to the drawings, and in particular to FIGS. 1 through 3 thereof, a new tailgate protecting device embodying the principles and concepts of the present invention and generally designated by the reference numeral 10 will be described.

As best illustrated in FIGS. 1 through 3, the tailgate protecting device 10 generally comprises a plate 12. The plate 12 has a front side 14, a back side 16, a top edge 18, a bottom edge 20 and a pair of side edges 22. The plate 12 has an opening 24 extending through the front 14 and back 16 sides. The opening 24 is positioned generally adjacent to the top edge 18 of the plate 12. The plate 12 preferably comprises an elastomeric material.

A panel 26 is securely attached to and substantially covers the back side 16 of the plate 12. The panel 26 comprises a cloth material. The cloth material is preferably a wool material. The panel 26 has an opening 28 therein corresponding to the opening 24 in the plate 12.

A first pair of securing means removably attaches the plate to a top edge 72 of a tailgate 70, each of the first securing means comprises a base portion 30. The base portion 30 has a pair of ends 32. Each of a pair of legs 34, 36 is integrally attached to and extends in a parallel direction away from one of the ends 32 of the base portion 30. The first securing means generally has a U-shape. An outer surface 38 of a first 34 of the legs is integrally coupled to the back side 16 of the plate 12 such that the other of the legs 36 are opposed to and extend in a parallel direction with respect to a plane of the back side 16. The first leg 34 is abutted against a juncture of the back side 16 and the top edge 18 of the plate 12. The first securing means is generally a hook comprising a metal and having an elastomeric coating thereon.

A second pair of securing means removably attaches the plate 12 to a bottom edge 74 of the tailgate 70. Each of the second securing means comprises a leg portion 40 and an arm portion 42. An end of the leg portion 40 is integrally coupled to an end of the arm portion 42. The leg portion 40 is orientated generally perpendicular to the arm portion 42. The second securing means generally has an L-shape. An outer surface 44 of the arm portion 42 is integrally coupled to and extends away from the back side 16 of the plate 12 such that the leg portion 44 extends in a generally same direction as the base portion 30 of the first securing means. The arm portion 42 is abutted against a juncture of the back side 16 and the bottom edge 20. The second securing means is generally a hook comprising a metal and having an elastomeric material coating thereon.

In use, the first securing means is placed over the top edge 72 of a tailgate 70 so that the second securing means slide under the bottom edge 74 of the tailgate. The wool 26 abuts the tailgate 70. The openings 24, 28 in the plate and panel are positioned to give access to the latch of the tailgate 70. The plate 12 is elastomeric to be resiliently stretchable so that the device 10 may be tautly attached to the tailgate 70.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A tailgate cover device, said device being removably attachable to a tailgate of a pick-up truck, the tailgate has a top edge and a bottom edge, said device comprising:

a plate, said plate having a top edge, a bottom edge, a front side and a back side;

a panel, said panel being securely attached to and substantially covering said back side of said plate;

a first pair of securing means for removably attaching said top edge of said plate to the top edge of said tailgate; and a second pair of securing means for removably attaching said bottom edge of said plate to the bottom edge of said tailgate.

2. The tailgate cover device as in claim 1, further comprising:

said plate having an opening extending through said front and back sides, said opening being positioned generally adjacent to said top edge of said plate; and said panel having an opening therein, said opening generally corresponding to said opening in said plate.

3. The tailgate cover device as in claim 1, wherein said panel further comprises a cloth material.

4. The tailgate cover device as in claim 1, wherein said plate comprises an elastomeric material.

5. The tailgate cover device as in claim 3, wherein each of said first securing means comprises:

a base portion, said base portion having a pair of ends, each of a pair of legs being integrally attached to and extending in a parallel direction away from one of the ends of said base portion, an outer surface of a first of said legs being integrally coupled to said back side of said plate such that the other of said legs is opposed to and extends in a parallel direction with respect to a plane of said back side, said first leg being abutted against a juncture of said back side and said top edge of said plate.

6. The tailgate cover device as in claim 5, wherein each of said second securing means comprises:

a leg portion and an arm portion, an end of said leg portion being integrally coupled to an end of said arm portion, said leg portion being orientated generally perpendicular to said arm portion, an outer surface of said arm portion being integrally coupled to and extending away from said back side of said plate such that said leg portion extends in a generally same direction as said base portion of said first securing means, said arm portion being abutted against a juncture of said back side and said bottom edge.

7. The tailgate cover device as in claim 6, wherein said first securing means and said second securing means each have an elastomeric coating thereon.

8. A tailgate cover device, said device being removably attachable to a tailgate of a pick-up truck, the tailgate having a top edge and a bottom edge, said device comprising:

a plate, said plate having a front side, a back side, a top edge, a bottom edge and a pair of side edges, said plate having an opening extending through said front and back sides, said opening being positioned generally adjacent to said top edge of said plate, said plate comprising an elastomeric material;

a panel, said panel being securely attached to and substantially covering said back side of said plate, said panel comprising a cloth material, said cloth material being a wool material, said panel having an opening therein corresponding to said opening in said plate;

a first pair of securing means for removably attaching said plate to the top edge of said tailgate, each of said first securing means comprising;

a base portion, said base portion having a pair of ends, each of a pair of legs being integrally attached to and extending in a parallel direction away from one of the ends of said base portion, said first securing means generally having a U-shape, an outer surface of a first of said legs being integrally coupled to said back side of said plate such that the other of said legs is opposed to and extends in a parallel direction with respect to a plane of said back side, said first leg being abutted against a juncture of said back side and said top edge of said plate, said first securing means having an elastomeric coating thereon; and a second pair of securing means for removably attaching said plate to the bottom edge of said tailgate, each of said second securing means comprising;

a leg portion and an arm portion, an end of said leg portion being integrally coupled to an end of said arm portion, said leg portion being orientated generally perpendicular to said arm portion, said second securing means generally having an L shape, an outer surface of said arm portion being integrally coupled to and extending away from said back side of said plate such that said leg portion extends in a generally same direction as said base portion of said first securing means, said arm portion being abutted against a juncture of said back side and said bottom edge, said second securing means having an elastomeric material coating thereon.

* * * * *